United States Patent [19]
Koch

[11] Patent Number: 4,878,157
[45] Date of Patent: Oct. 31, 1989

[54] FIBER OPTIC CHRISTMAS TREE

[76] Inventor: Paul H. Koch, c/o Menhume Helicopters, 3222 Kuiho Hwy., Lihue, Hi. 96766

[21] Appl. No.: 274,345

[22] Filed: Nov. 21, 1988

[51] Int. Cl.⁴ .............................................. F21P 1/02
[52] U.S. Cl. .................................. 362/123; 362/32; 362/806
[58] Field of Search .................. 362/32, 123, 806, 811

[56] References Cited

U.S. PATENT DOCUMENTS

| | | | |
|---|---|---|---|
| 3,465,139 | 9/1969 | Siegal | 362/32 |
| 3,544,783 | 12/1970 | Williams, Sr. | 362/123 |
| 3,564,233 | 2/1971 | Cox | 362/32 |
| 3,641,335 | 2/1972 | Wall | 362/123 |
| 3,735,117 | 5/1973 | Hunt | 362/123 |
| 3,766,376 | 10/1973 | Sadacca et al. | 362/123 |
| 3,767,910 | 10/1973 | Harrigan | 362/32 |
| 3,970,834 | 7/1976 | Smith | 362/123 |
| 4,060,722 | 11/1977 | Foley | 362/123 |
| 4,068,118 | 1/1978 | Carrington | 362/32 |
| 4,428,988 | 1/1984 | Adinamis | 362/32 |
| 4,777,571 | 10/1988 | Morgan | 362/32 |

FOREIGN PATENT DOCUMENTS

| | | | |
|---|---|---|---|
| 2233934 | 7/1972 | Fed. Rep. of Germany | 362/32 |
| 2732805 | 2/1979 | Fed. Rep. of Germany | 362/32 |
| 0761783 | 9/1980 | U.S.S.R. | 362/32 |

Primary Examiner—Ira S. Lazarus
Assistant Examiner—Sue Hagarman
Attorney, Agent, or Firm—Leon Gilden

[57] ABSTRACT

A fiber optic Christmas tree is set forth wherein a conical Christmas tree of traditional configuration is presented wherein a series of parallel planes intersect the conical configuration to define the series of stacked, segments of the tree. The segments include a hollow cylindrical axially aligned transparent conduit housing an elongate light source. Each segment of the conical Christmas tree includes radially through-extending apertures defining a matrix therethrough wherein the exterior openings of the apertures accept a like number of fiber optic wands wherein a terminal end of the wands include a series of flared fiber optic fibers extending therefrom to simulate foliage of the tree wherein each of the wands is formed of various colorations to present a desired effect upon viewing of the tree. The segments are aligned relative to one another by the transparent conduit and by upstanding bosses formed to upper surfaces of the segments aligned with confronting grooves of the next adjacent upper segment to maintain the rigidity of the tree once erected.

4 Claims, 3 Drawing Sheets

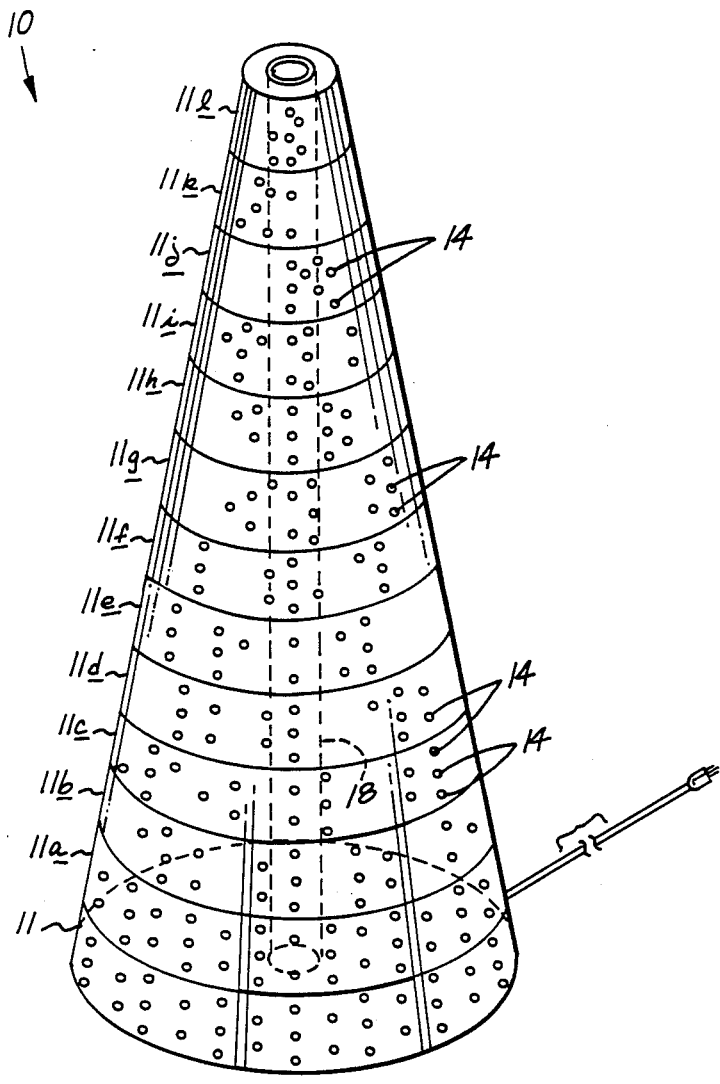

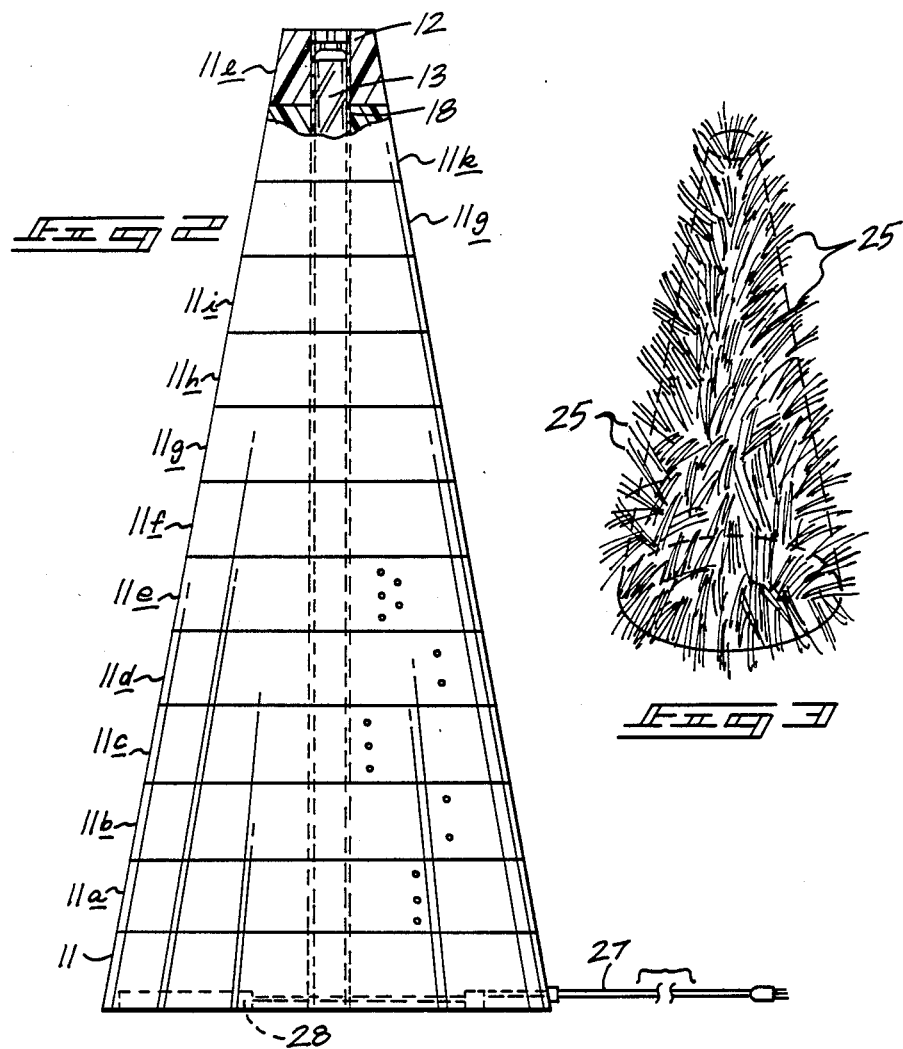
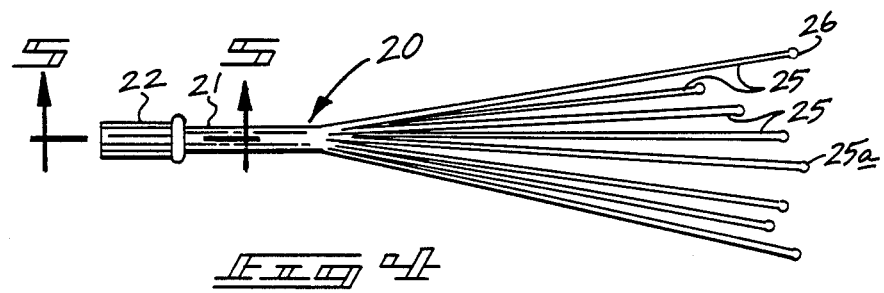

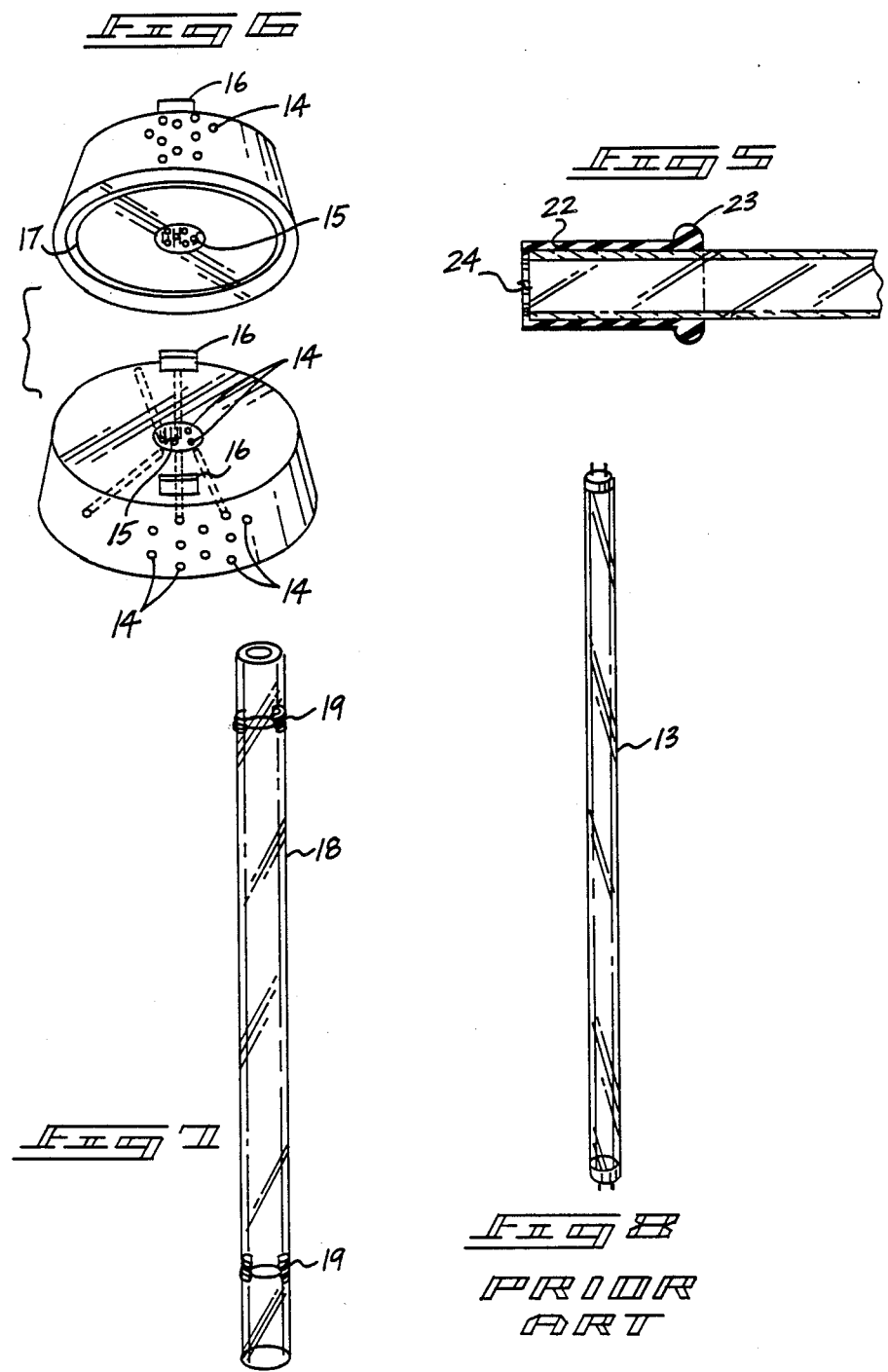

FIBER OPTIC CHRISTMAS TREE

BACKGROUND OF THE INVENTION

1. Field of the Invention

The field of the invention relates to manufactured Christmas trees, and more particularly pertains to a new and improved fiber optic Christmas tree enabling the arrangement of various illuminated color combinations about the surface of the tree utilizing a series of fiber optic rods selectively positionable within a matrix of light conducting openings.

2. Description of the Prior Art

The use of artificial Christmas trees and their commercial availability is well known in the prior art. As may be appreciated, these devices have normally been of a pre-arranged geometrical and ornamental configuration. Christmas trees in the prior art that have utilized artificial illumination to enhance the aesthetic appeal of such trees have been limited in their geometrical adaptability to various forms accepting restricted size trees of this class. For example, U.S. Pat. No. 3,641,335 to Wall sets forth a fiber optic Christmas tree utilizing a series of fiber optic members integrally secured to a tapering cylinder wherein a triangular backstop is secured adjacent the flared fiber to enhance the visual effect thereof. The patent, however, does not provide the interchangeable fiber optic stems as does the instant invention within a matrix of openings wherein the openings and the segments of the instant invention are manipulatable to effect a change in the height and illuminated effect of the fiber optics utilized.

U.S. Pat. No. 3,735,117 to Hunt sets forth an artificial Christmas tree utilizing electrical circuits built into the tree leading to sockets scattered about twigs on the tree to avoid a stringing of circuitry about the surface of the tree.

U.S. Pat. No. 3,766,376 to Sadacca sets forth an illuminated Christmas tree utilizing a multiple of fiber optics extending upwardly from the base of the tree trunk. The fiber optic conduits branch out from the tree to provide a conduit of light to the various fiber optics, but as in the Wall patent fails to provide the ability to modify the matrix of fiber optics utilized about the tree, as does the instant invention.

U.S. Pat. No. 3,970,834 to Smith sets forth a Christmas tree with a plurality of segments threadedly secured together to provide a tree that may be readily stored, then erected when necessary.

U.S. Pat. No. 4,060,722 to Foley sets forth a further fiber optic Christmas tree utilizing fiber optics emanating from a central upwardly tapering trunk wherein the fiber optics are fixedly secured to fiber optic cables positioned through the center of the tree, as is typical of the prior art.

As such, it may be appreciated that there is a continuing need for a new and improved fiber optic Christmas tree that addresses the problems of storage and adaptability, and in this respect the present invention substantially fulfills this need.

SUMMARY OF THE INVENTION

In view of the foregoing disadvantages inherent in the known types of artificially illuminated Christmas trees now present in the prior art, the present invention provides a fiber optic Christmas tree wherein the same may be manipulated to effect a different and varying height and configuration of fiber optics selectively positionable within a matrix of light conducting openings formed within segments of the device. As such, the general purpose of the present invention, which will be described subsequently in greater detail, is to provide a new and improved fiber optic Christmas tree which has all the advantages of the prior art artificially illuminated Christmas trees and none of the disadvantages.

To attain this, the present invention includes a stockpile series of conical segments securable upon one another utilizing upwardly extending arcuate bosses registering within an aligned circumferential groove. Further, a transparent cylindrical shaft includes a source of artificial light, such as a florescent bulb, and further the bulb conducts light through a series of through-extending apertures radially formed within each segment of the tree to transmit light to fiber optic bundles selectively positionable within each of the openings of the matrix.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fiber optic Christmas tree which has all the advantages of the prior art fiber optic Christmas trees and none of the disadvantages.

It is another object of the present invention to provide a new and improved fiber optic Christmas tree which may be easily and efficiently manufactured and marketed.

It is a further object of the present invention to provide a new and improved fiber optic Christmas tree which is of a durable and reliable construction.

An even further object of the present invention is to provide a new and improved fiber optic Christmas tree which is susceptible of a low cost of manufacture with regard to both materials and labor, and which accordingly is then susceptible of low prices of sale to the consuming public, thereby making such fiber optic Christmas trees economically available to the buying public.

Still yet another object of the present invention is to provide a new and improved fiber optic Christmas tree which provides in the apparatuses and methods of the prior art some of the advantages thereof, while simultaneously overcoming some of the disadvantages normally therewith.

Still another object of the present invention is to provide a new and improved fiber optic Christmas tree wherein the tree is formed of a plurality of conical segments including a matrix of radial openings formed through the segments to deliver light from a light source to a prearranged colorations of fiber optic bundles positioned within the openings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken in elevation of the instant invention.

FIG. 3 is an isometric illustration of the instant invention illustrating the fiber optic bundles positioned within the tree.

FIG. 4 is an orthographic side view of a typical fiber optic bundle.

FIG. 5 is an orthographic view taken along the lines 5—5 of FIG. 4 in the direction indicated by the arrows.

FIG. 6 is an isometric illustration of a typical registering arrangement between segments.

FIG. 7 is an isometric illustration of a central transparent tube of the instant invention.

FIG. 8 is a prior art illustration of a typical artificial light source as utilized by the instant invention.

DESCRIPTION OF THE PREFERRED EMBODIMENT

With reference now to the drawings, and in particular to FIGS. 1 to 8 thereof, a new and improved fiber optic Christmas tree embodying the principles and concepts of the present invention and generally designated by the reference numeral 10 will be described.

More specifically, it will be noted that the fiber optic Christmas tree 10 essentially comprises a stacked series of conical segments 11 comprising a base segment 11a through 11n comprising intermediate segments, as illustrated in FIGS. 1 and 1 for example, with an uppermost cap socket 12 crowning the stacked series of segments and electrically associating an included elongate light source 13 (florescent bulb) with the base segment 11 which includes the necessary electrical components such as a transformer and electrical connector (to be discussed in more detail below). Each of the segments includes a surrounding matrix of through-extending radially oriented light conduits 14 (see Fig. 6 for example) radially directed to a cylindrical core 15 that is axially aligned with the various segments of the instant invention. Each segment, as illustrated in FIG. 6, includes a plurality of upstanding arcuate tabs 16 integrally formed to an upper surface of each segment that register within a cylindrical groove 17 formed in a lowermost surface of each conical segment. When stacked and oriented, as illustrated, a cylindrical diffuser tube 18 is positioned within the cylindrical core 15 and further adds to the rigidity and organization of the assembled Christmas tree 10. The diffuser tube 18 is preferably formed including connectors 19 to separate the tube such that a shorter Christmas tree may be assembled utilizing a substitute base segment to house the various components, such as a transformer etc. The diffuser will include a plurality of conductive wires associated with the cap socket 11 to complete an electrical circuit, as is well known to one of ordinary skill in the electrical arts.

The matrix of the through-extending radial light conduits 14 each accept a fiber optic member 20, as illustrated in FIG. 4. Each fiber optic member 20 includes a light conducting cylindrical base portion and a resilient sealing cylindrical end plug 22. Reference to FIG. 5 illustrates the end plug 22 including a forwardmost abutment ridge 23 to limit the positioning length of each fiber optic member 20 within a respective light conduit 14. Furthermore, each end plug 20 is formed with a through-extending central bore 24 to accept each respective light conducting cylindrical base 21 of the fiber optic members. The fiber optic members 20 terminate in a fiber spray 25 of an array of individual fibers formed with cylindrical end nodes 26 for safety purposes to avoid penetration of a fiber optic member into an object and to further enhance the lighting effect directed through the spray 25.

Each base segment 11 (only one is shown) and substitutes base segment is understood to accomodate a shortened cylindrical diffuser tube 18 to include the same components of a base transformer 28 and an associated electrical connector 27 to associate the light source 13 with an appropriate electrical source.

It is further to be understood that the segments described of the conical Christmas tree each include upper and lower parallel surfaces containing the tabs 16 and grooves 17 respectively. Further, the dimensional variations as to the diameter and height of the associated segments may be varied and remain within the scope of the instant invention. Further it should be noted that each of the fiber optic members 20 and associated fiber sprays 25 are one of a plurality of such members positionable within the matrix of conduits 14 to present the array, as illustrated in FIG. 3. To this end, the fiber optic members 20 are to be formed in a variety of colorations to enable one utilizing this invention to effect a color design and configuration as desired. Also, the rotatable disposition of each of the segments relative to the diffuser tube 18 enables a variation of design configuration even when the fiber optic members 20 are positioned within the respective conduits 14.

As to the manner of usage and operation of the instant invention, the same should be understood from the above description and accordingly no further discussion relative to the manner of usage and operation of the instant invention shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fiber optic Christmas tree comprising,
   a conical Christmas tree including a plurality of conical segments, each segment formed with an axially aligned cylindrical central chamber, and
   a plurality of light conducting conduits radially directed from said central chamber to an exterior surface of each segment, and
   a light source positionable axially of said Christmas tree when said segments are stacked upon one another, and
   a plurality of fiber optic members selectively positionable within said conduits to visually direct light from said light source through said fiber optic members, and
   wherein the fiber optic members are formed in a variety of colors, and
   wherein a cap socket is positionable on an uppermost segment of the Christmas tree when the segments are stacked upon one another, wherein the cap socket includes an electrical socket for electrical association of the light source with a base segment wherein said base segment is positionable at the lowermost terminal end of the segments when stacked, and
   wherein a transparent cylindrical diffuser tube is positionable through the axial chamber of each of the plurality of segments to effect diffusion of the light source and provide stability to the stack of segments, and
   wherein each conical segment is defined by a parallel upper and lower surface, and wherein each upper surface includes at lease one arcuate tab directed upwardly and orthogonally relative to the upper surface, and each lower surface contains a cylindrical groove to slidingly receive a tab from a lowermost segment.

2. A fiber optic Christmas tree as set forth in claim 1 wherein each fiber optic member includes a cylindrical base and a plurality of individual fiber optic fibers extending outwardly from the base, and each fiber optic terminates in a cylindrical node.

3. A fiber optic Christmas tree as set forth in claim 2 wherein a further end of each fiber optic member includes a resilient sealing plug to sealingly secure each fiber optic member within a respective light conduit.

4. A fiber optic Christmas tree as set forth in claim 3 wherein each resilient plug is defined by a cylindrical body and terminates in a forward circumferential ridge to limit positioning of a respective fiber optic member within a respective light conduit.

* * * * *